Feb. 16, 1932.  K. SLIDELL ET AL  1,845,350
PROCESS OF PRODUCING CELLULAR BUILDING MATERIAL
Filed Aug. 1 1929  2 Sheets-Sheet 1
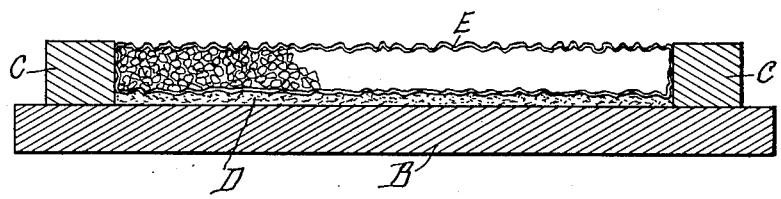
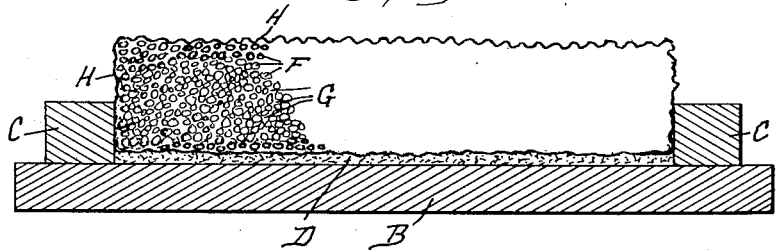
Witness:
William P. Kilroy
Inventors
Kemper Slidell and
Sherman Q. Lee.
By Samuel W. Banning Atty Feb. 16, 1932. K. SLIDELL ET AL 1,845,350
PROCESS OF PRODUCING CELLULAR BUILDING MATERIAL
Filed Aug. 1, 1929 2 Sheets-Sheet 2
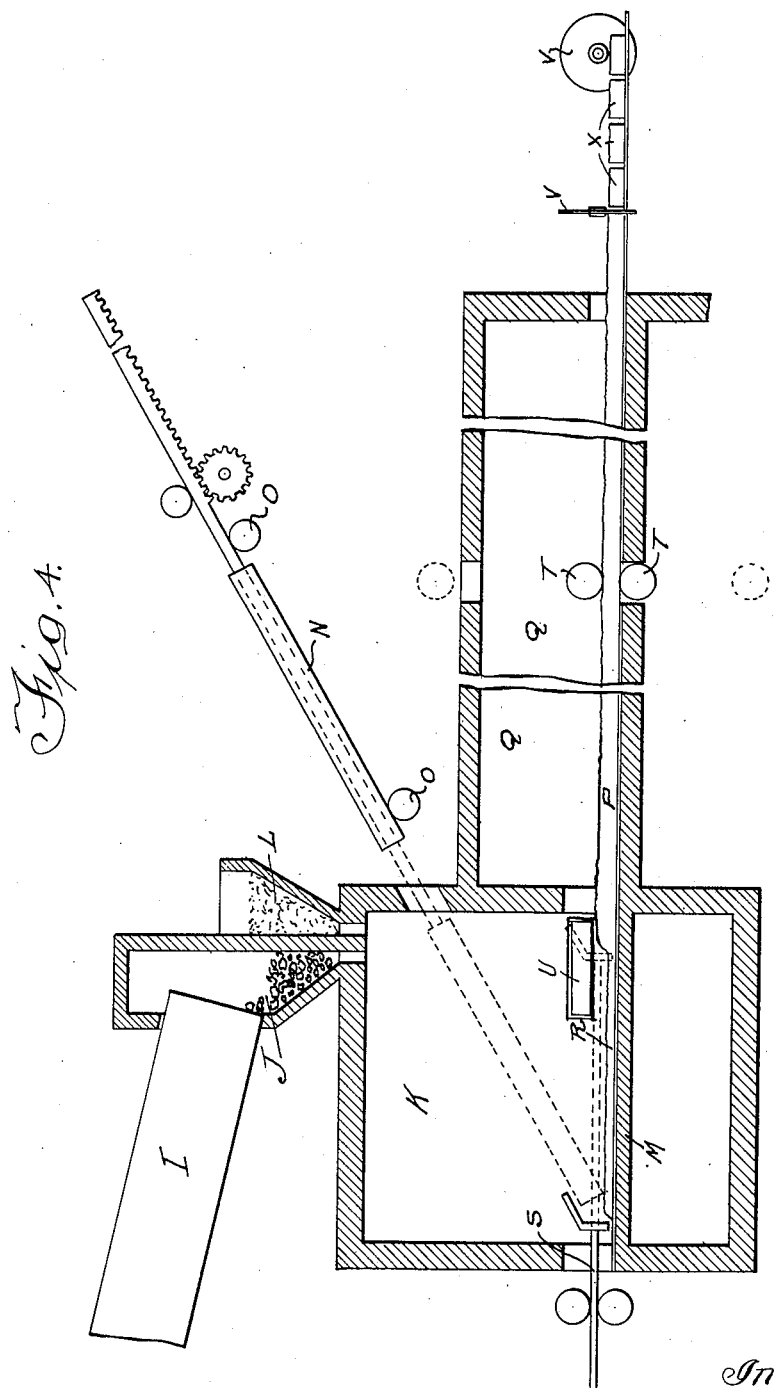

Patented Feb. 16, 1932

1,845,350

UNITED STATES PATENT OFFICE

KEMPER SLIDELL AND SHERMAN Q. LEE, OF MADISON, WISCONSIN, ASSIGNORS, BY MESNE ASSIGNMENTS, TO AMERICAN FACE BRICK RESEARCH CORPORATION, A CORPORATION OF ILLINOIS

PROCESS OF PRODUCING CELLULAR BUILDING MATERIAL

Application filed August 1, 1929. Serial No. 382,749. REISSUED

This invention is directed to a process of treating argillaceous material in granular form for the purpose of producing building blocks or units and other articles of manufacture.

The product produced by the present process possesses such qualities as economy of raw materials, saving of transportation costs, high speed in erection when the product is used as a building unit, superior insulation against heat and cold, and imperviousness to moisture.

The material is of a cellular or vesiculated character throughout, having a structure very similar to that of baked bread, which readily floats in water and is strong enough for the supporting walls of buildings, and is non-absorptive of moisture.

The present process is directed to the production of this material in predetermined forms and sizes, which may be used either in the original form as delivered from the kiln or furnace, or in smaller sections produced by cutting or otherwise dividing the the original block or slab; and the various steps of the process are harmoniously related to the development of a relatively uniform cellular structure throughout the mass, and to the avoidance of conditions which would tend to produce violent ebullition or explosive violence in the discharge of gases, which would be prejudicial in securing the desired uniformity of structure.

Provision is therefore made, in the performance of the process, for the initial burning out and dissemination of the more volatile of the organic matter originally contained in the raw material and for the elimination of other gas forming materials which might disrupt the continuity and relative uniformity of the cellular structure by violent ebullitions in the bloating stage of the process, so that a gradual and uniform swelling of the material at the proper stage in the process will be insured.

The raw material employed in the present process is of argillaceous character, such as clays and shales ordinarily employed in brick making. The first step in the process is to grind or otherwise break up the clay into comparatively small granules, none of which are preferably of a size larger than about a sixth of an inch, and of decreasing fineness down to dustlike particles. This preliminary grinding into comparatively small dimensions is desirable in order to insure uniformity in the penetration of the heat and in the evolution of the gases, and also to insure a complete liquefaction and unification of the constituent particles, so that in the completed product the identity of the original particles will be completely merged into the unit of the cellular mass.

After the material has been ground to the desired degree of fineness, it is given a preliminary heating in a rotary or other type of agitating furnace and heated until it is slightly below the fusing stage, but without increasing the heat to a degree which will modify its granular character or cause the particles to become sticky and adherent.

After preheating, and while in the heated condition, it is then transferred to a non-agitating furnace or heating chamber and is quiescently heated to a temperature at which it fuses and puffs. It is then slowly cooled and annealed and finally delivered in form to be used either in the original form of a block or slab, or cut into smaller units if desired.

Almost any argillaceous material is suitable for making this material. The purer fire clays may be so difficult to fuse as to be impracticable for use, but most clays and shales will make this material. Carbon, sulphur and iron are constituents of clay that contribute to or are perhaps essential to making a clay capable of being bloated.

The drawings illustrate more or less diagrammatically the condition of the material during the various stages of the process, together with diagrammatic representation of so much of the kiln in which the material is bloated as is necessary to an understanding of the process and the nature of the product resulting therefrom.

Figure 1 is a view showing a pile of the granular material in its original broken up or disintegrated condition;

Fig. 2 is a view showing the condition of a charge of material after it has formed a fused surface skin or layer;

Fig. 3 is a view showing the final condition of the material after it has been completely bloated; and Fig. 4 is a diagrammatic view of a simplified form of kiln or furnace adapted for the performance of the present process.

The material is ground or otherwise broken up into granules or particles A to a fineness approximately suitable for brick making, as indicated in Figure 1. We have found that by breaking it up so that it will go through a one-sixth inch mesh produces a suitable granular mass for future treatment, although we do not limit the raw material to this degree of fineness. We preferably grind it dry and in some type of grinder used for grinding brick clays or shales.

The ground material is placed in some type of agitating kiln where it is rapidly heated to a temperature of from 1500° to 1800° F., the object being to heat to the highest practicable temperature at which the granular condition of the material will be preserved without fusion. We have found a rotary type kiln very suitable for this purpose, but do not limit ourselves to the use of this type of kiln. The purpose of this heating is to dry and uniformly heat the material without fusing it. As the material near the temperature above stated, it first begins to give off internally created gases, and then, if continued above this, becomes sticky. These gases have an affinity for oxygen, and to prevent the giving off of too much of these gases we find it advantageous to heat the material in an atmosphere as nearly devoid of oxygen as possible.

While still in the granular stage, the material is transferred to some type of kiln in which the material can be quiescently heated to a higher temperature. The temperature is for most material run up to 2000° or 2300° F. We have found a stationary semi-muffle type of furnace quite satisfactory for this purpose. A refractory slab B is utilized on which to deposit the material. This slab is supported above the floor of the furnace so that the heat can reach the material both from above and below. We find it advantageous to transfer the material from the agitating kiln to the quiescent kiln by gravity.

The material is leveled, or if desired is spread between side forms C over the refractory slab of the quiescent kiln directly on top of a thin layer D of sand or other material that will keep it from sticking to the slab. The side forms may be of metal which will scale under heat, the scale parting from the metal body, or carborundum or the like may be used, or strips of the present product, which will fuse onto the mass under treatment and may be removed therewith, and thereafter trimmed from the completed block and again used as forms in succeeding operations. This anti-sticking medium must be of some material that will part in itself, or which is a very cheap or waste product. We find that in addition to sand and gravel, graphite and talc can be used.

In view of the fact that the anti-sticking medium serves to prevent adherence of the material under treatment, and serves, after bloating, to permit the block or slab of material to be moved forwardly over the floor of the furnace, we employ the term "lubricant" as a proper designation for a material having these attributes. After the material is placed on the bed of anti-sticking material, it is leveled or struck off to a uniform depth, as in Fig. 2. This is done so that the heat will penetrate the material uniformly throughout the mass, and also so that the finished product will be of reasonably uniform thickness or dimensions.

The first action of the heat when the material is subjected to this higher temperature is to fuse the surface particles so that they flow together and form a vitrified sealing skin E. This skin imprisons in the material a part of the air that is between the particles. As the heat penetrates beyond the skin it fuses or welds the particles together, expands the imprisoned air and liberates the heat-generated gases within the material. These gases are formed from the breaking down of sulphur, carbon and other gas producing substances in the material. This expanded air and liberated gas forms bubbles or cells throughout the fused or vitrified mass, so that it has very much the structure of yeast-leavened dough, the cell walls being of vitrified material and the identity of the original granulates or particles having disappeared in the general liquefaction and bloating of the entire mass.

During the bloating stage, the material expands and puffs to from two to three times its original volume, as indicated in Fig. 3. We have found that material preheated to 1800°, when placed in the bloating temperature, bloats to a suitable degree when heated from ten to fifteen minutes for each inch of original thickness, so that a two inch bed of material will bloat to four inches in twenty to thirty minutes.

In most cases the material will bloat to the desired level without rolling, but if a particularly level surface or a uniform thickness of the bloated material is desired, we may roll the top while it is hot. Furthermore, if a special shape is desired, the bloated material while still plastic can be rolled in various ways to dimensions.

To keep the material from sticking to the roller, we use a roller that is much cooler than the hot clay, or sprinkle the top surface with sand or other parting material; and for most purposes the material will be bloated while in the form of a column having parallel top and bottom surfaces either for use as a completed block or slab of that form or to facilitate cutting to smaller blocks or slabs without excessive waste. For some purposes we can deform the slabs by top and bottom rollers, as, for instance, in making some forms of roofing tile.

A continuous slab or column of indefinite length can be produced if desired by introducing the material continuously or in charges, and fusing new material to that previously bloated, the completed portion of the slab being moved forwardly from time to time to make way within the furnace for incoming charges of material.

When cool, the material retains its cellular structure and becomes solid and somewhat brittle. If it is cooled rapidly, it shatters from the strains of contraction; therefore, we find that it is necessary to cool the material quite slowly to counteract this self-destructive tendency. It can be quickly cooled down to a cherry color without injury, but below this stage it must be cooled very slowly. We find that with the clays we have used, a four inch slab requires about three to six hours to reduce to a handling temperature.

During the preheating stage, it is desirable to maintain a neutral or reducing atmosphere in order to burn out only the more volatile or explosive of the gases which are relied upon to bloat the material during the second stage of the process.

It is also desirable, in the bloating stage, to maintain a neutral or reducing temperature, but after the material has reached the annealing chamber, it may be desirable at an early stage in the annealing to admit additional oxygen in order to oxidize the surface in securing the desired coloration. It is also possible to vary the coloration in various ways, either by the use of a surface coating of clay or other material specially selected for its coloration, or by otherwise treating the product in ways well understood in the brick making art in order to secure the desired effect.

It may also be desirable to vary the exposed surface texture of the mass when undergoing the bloating treatment, by sprinkling a layer of granular material of a particular or uniform degree of fineness over the surface, so that the resultant pebbled or roughened surface effect will be modified in the desired manner.

It is obvious that both the surface texture and coloration may be regulated by the spreading of a thin surface layer of granular material of the desired size, which also possesses the property of producing the intended coloration.

Although for some purposes the block or slab may be used in the form in which it comes from the furnace and presenting the pebbled top surface texture characteristic of this material before cutting, it will be found that for many purposes it is necessary to cut the material into shapes. For bricks, building block, roofing tiles, roofing slabs, etc., we cut the slab as it comes from the furnace, by means of abrasive wheels, or other cutting devices. For accurately shaped units, we grind the top and bottom surfaces, but for most units, these surfaces, more or less pebbled or rough, can be left just as they come from the kiln, since the pebbling presents an attractive texture especially desirable when the material is used for exterior wall building purposes.

This material has a highly cellular structure. The cells F are spherical and preferably none are over one-eighth of an inch in diameter, and are separated by continuous cell walls G of vitrified material. Interspersed with larger cells will be finer ones, some so fine as to be invisible to the eye. Its weight varies with the degree of puffing to which it is subjected, but we find in general that the material that has been bloated so as to have a weight of twenty to fifty pounds per cubic foot is entirely suitable for building materials for various purposes. Its compressive strength varies with the bloating temperature control and atmosphere control exercised in preheating and bloating, and also with the care with which it has been annealed. Samples which we have tested range from 630 to 2690 pounds per square inch. We find that about 1500 pounds per square inch is the average for the material we make into building units.

The material is practically impervious to moisture even when subjected to considerable hydrostatic pressure, due to the fact that the vitrified cell walls afford no interconnecting pores or crevices for the passage of water. The material is easily penetrated by nails. It can be cut with a metal saw as well as by an abrasive wheel. The cut surfaces are usually of a grayish purple, but they have areas tinged with tans, greens, purples, and other colors, depending upon the constituents of the raw materials, or materials purposely added in order to secure the desired colors, and the atmosphere of the furnace.

These cut surfaces may, if desired, be exposed to a flame containing oxygen, which will color them to shades approximating those to which the same material burns in a brick. The exterior upper surfaces H, which have not been cut, have approximately the color of brick burned from the same material, under like oxydizing or reducing conditions, and present a rough and pebbled appearance and texture, owing to the irregular protrusion of the original particles. The outer skin, however, extends continuously, due to the fusing of the particles together, and the under surface and side surfaces which have had contact with the side form or with the parting material are likewise roughened, but to a lesser degree than the top, and usually retains a thin layer or particles of the parting medium used which has adhered intimately.

This product is suitable for many uses as a building material. One preferred use of it is to cut it directly into building blocks, bricks, roofing slabs, etc. It can be formed also into roofing tile. Large thick blocks of it can be used in fireproof floor construction for "voids" between concrete beams. Defective units, or for that matter the product itself, can be broken up or crushed, as is rock, into concrete aggregate.

As illustrative of a furnace arrangement suitable for the practicing of the present process, we have shown a furnace adapted to operate continuously in the production of an extended slab of material of indefinite length, formed by the welding of successive charges of raw material, each to the preceding charge, although it will be understood that the furnace construction herein shown is intended for purposes of illustration only.

In the present instance, the furnace includes a rotary preheater I, which is arranged at an incline and which serves to initially heat the granular material to between 1500 and 1800° F., and thereafter deliver it with a minimum loss of heat into a chute J which extends above the roof of a stationary kiln K within which the material is bloated.

As shown, provision is made for the delivery of a coating or layer of sand or other refractory parting or lubricating material from a hopper L. The bloating kiln is provided with a slab M upon which a thin layer of sand is spread, and above the same the preheated granular argillaceous material is spread in the form of a layer which is preferably defined along its sides by the provision of side forms of the character heretofore described.

In order to properly distribute the sand over the surface of the slab and to deposit the layers of argillaceous material thereon, in uniform depth, a charging chute N is provided, which as shown is in the form of a flanged plate suitably mounted on rollers O or the like, and adapted to be projected obliquely downward or otherwise into the furnace to bring its lower or discharging end into proximity with the slab M. When in charging position, sand may be delivered from the hopper L, and by withdrawing the charging chute at a uniform rate, a thin layer or coating of sand will be deposited upon the slab M. Thereafter the charging chute may again be inserted to bring its discharging end into close proximity to the slab, and granular argillaceous material from the hopper J be discharged in a uniform stream onto the charging chute, while the latter is withdrawn to uniformly distribute the argillaceous material in a layer or deposit above the sand. After the charge has been thus properly distributed it is permitted to remain in a quiescent state until the bloating occurs to the desired degree.

In the drawings, P indicates a charge which has been bloated and moved into the annealing chamber Q, which may be of any desired length required to make provision for the annealing of a slab or column of the desired length.

R represents a charge of the granular material before it has been bloated, and it will be noted that the charge R contacts with the terminal edge of the bloated charge P, so that when bloating occurs the charge R will unite with the previously bloated charge in the formation of a continuous unified slab or column.

The removal of each bloated charge from the bloating chamber to the annealing chamber may be effected by the action of a push bar S, which may be thrust inwardly into the bloating chamber in conjunction with the action of rollers T, which engage the completed slab within the annealing chamber and serve to draw it forwardly concurrently with the inward thrust of the push bar S so as to prevent buckling or bulging, due to the thrust of the bar against the end of the still plastic bloated charge still within the bloating chamber.

It is preferred to make provision for the withdrawal of the pulling rollers T from the heat of the annealing chamber save when the action of the rollers is required in forwarding the slab or column, and for this purpose the rollers are arranged to be separated and withdrawn bodily from the heat of the annealing chamber during the intervals when their use is not required. Pulling rollers may be located or placed at the end of said annealing chamber and so engage the cooled column.

Where it is required to roll the surface of the slab, a roller U may be provided which as shown runs crosswise of the slab while it lies within the bloating chamber, although in many cases it will be unnecessary to roll or otherwise modify the surface of the material in any way.

As the material passes from the annealing chamber, it may be cut by the action of cutting saws or disks V, one of which as shown is arranged to cut the slab transversely while the other is arranged to cut it longitudinally in the production of bricks or blocks X of the desired size.

The above arrangement enables the process to be carried on by intermittent stages, so that as one charge is completely bloated it will be followed by another charge in the production of a continuous slab. If desired, however, the feeding of the material may be continuous, and the slab may be constantly moved forwardly, so that granular material will be added to the end of the continuously advancing slab or column in the form of small increments or accretions rather than in the form of definitely delivered charges, in which case, however, it will not be feasible to advance the slab or column by a thrust from the rear.

Various modifications in the method of carrying out the principal steps of the process may be made, and numerous variations in form of the apparatus may be employed without departing from the spirit of the invention, and it will be understood that the apparatus shown serves merely for the purpose of illustrating a convenient and simplified means of carrying on the process of the present invention.

We claim:

1. The process of producing a block of material of substantially predetermined dimensions, which consists in breaking up earthy material into the form of granules of a size adapted to be spread out in the form of a substantially level layer, piling the mass of granular material in the form of a level layer of substantially uniform depth, and subjecting said layer, without agitation, to an externally maintained bloating temperature to cause the initial formation of a continuously extending surface film, and the formation of a unitary cellular structure throughout the mass.

2. The process of producing a block of material of substantially predetermined dimensions, which consists in breaking up earthy material into the form of granules of a size adapted to be spread out in the form of a substantially level layer, subjecting the granular particles to a preliminary treatment under agitation and to a temperature not exceeding that at which the particles retain their granular condition, piling the mass of granular material in the form of a level layer of substantially uniform depth, and subjecting said layer, without agitation, to a bloating temperture to cause the initial formation of a continuously extending surface film, and the formation of a unitary cellular structure throughout the mass.

3. The process of heating broken up argillaceous material under agitation to a temperature not exceeding that at which the particles retain their granular condition, continuing the heating at a higher temperature and with the material in non-agitated condition, thereby initially forming a fused surface coating constituting a sealing skin that imprisons the air between the inner particles, and as it penetrates welds the buried particles together, expands the imprisoned air, and liberates and expands the heat generated gases so that the mass of material while in fused condition expands or bloats, and withdrawing the bloated material from the zone of higher temperature while in a cellular condition.

4. The process of heating broken up argillaceous material under agitation to a temperature not exceeding that at which the particles retain their granular condition, continuing the heating at a higher temperature and with the material in non-agitated condition, thereby initially forming a fused surface coating constituting a sealing skin that imprisons the air between the inner particles, and as it penetrates welds the buried particles together, expands the imprisoned air, and liberates and expands the heat generated gases so that the mass of material while in fused condition expands or bloats, withdrawing the bloated material from the zone of higher temperature while in a cellular condition, and dividing the bloated mass into units of the desired size.

5. The process of bloating broken up earthy material in granular form in the production of a column of cellular material, which consists in introducing succeeding layers of earthy material while in granular form, and in deposits of uniform depth, into a confined heat zone maintained at a bloating temperature, and in bringing such deposits into edge contacting relation with one another so that they become fused together in a continuous cellular slab.

6. The process of bloating broken up earthy material in granular form within a confined heat zone and at an externally maintained bloating temperature, and in contact with a layer of loose refractory material adapted to prevent adhesion of the bloated material to the supporting surface, and serving as a parting and lubricating medium to permit removal of the bloated mass from the heat zone.

7. The process of heating broken up preheated earthy material in granular form within a confined heat zone and at an externally maintained bloating temperature, and in contact with a layer of loose refractory material adapted to prevent adhesion of the bloated material to the supporting surface, and serving as a parting and lubricating medium to permit removal of the bloated mass from the heat zone.

8. The process of producing cellular building units of exact dimensions from earthy material, which consists in preheating the material in granular form, introducing successive charges of the preheated granular material into a confined heat zone at a temperature adapted by the application of external heat to fuse the particles of each charge and produce a bloated mass, each succeeding charge being fused and bonded to the preceding bloated mass to produce a continuous column.

9. The process of producing cellular building units of exact dimensions from earthy material, which consists in preheating the material in granular form, introducing successive charges of the preheated material into a confined heat zone maintained by the application of external heat at a temperature adapted to fuse the particles of each charge and produce a bloated mass, each succeeding charge being fused and bonded to the preceding bloated mass to produce a continuous column, and slowly cooling the column as it emerges from the heat zone to prevent shattering from temperature shock.

10. The process of producing cellular building units of exact dimensions from earthy material, which consists in preheating the material in granular form, introducing successive charges of the preheated material into a heat zone at a temperature adapted to fuse the particles of each charge and produce a bloated mass, each succeeding charge being fused and bonded to the preceding bloated mass to produce a continuous column, slowly cooling the column as it merges from the heat zone to prevent shattering from temperature shock, and producing desired coloration of the material by controlling the temperature and atmospheric content during the cooling operation, and dividing the mass into portions of the desired size and shape.

11. The process of producing cellular building units of exact dimensions from earthy material, which consists in preheating the material in granular form, introducing successive charges of the preheated material into a heat zone at a temperature adapted to fuse the particles of each charge and produce a bloated mass, each succeeding charge being fused and bonded to the preceding bloated mass to produce a continuous column, slowly cooling the column as it emerges from the heat zone, to prevent shattering from temperature shock, dividing portions of the desired size and shape from the mass, and producing the desired surface coloration by heat treatment under proper atmospheric conditions.

12. The process of producing a cellular mass from small particles of earthy material maintained in a quiescent state, which includes the initial formation of an envelope or skin of the fused material around the entire mass of granular particles to prevent the escape of the gases formed on the interior, and a subsequent fusing and bloating of the interior portions of the mass to form a cellular product.

13. The process of producing a cellular product from earthy material in granular form, which consists in preheating the material in a reducing atmosphere and at relatively lower temperature, and in thereafter spreading it in the form of a layer of substantially uniform depth and bloating it at a relatively higher temperature to produce a cellular slab.

14. The process of producing a cellular product from granular earthy material, which includes the depositing of said material in granular form within a furnace upon a layer of loose refractory material to prevent adhesion to the furnace, subjecting the material thus deposited to an externally maintained bloating temperature, and in similarly depositing a succeeding charge upon loose refractory material and in contacting relation to the previously bloated charge to cause fusion therewith in the production of a continuous column of material of substantially uniform thickness.

15. The process of heating broken up argillaceous material under agitation in a kiln to a uniformly distributed temperature lower than that at which it becomes sticky, continuing the heating but at a higher temperature and with the material non-agitated, thereby bloating or expanding the material, and cooling the material to rigidity and to a handling temperature by cooling slowly enough to prevent contraction cracking.

16. The process of heating broken up argillaceous material under agitation in a kiln to a uniformly distributed temperature not exceeding that at which it becomes sticky, continuing the heating but at a higher temperature and with the material non-agitated, thereby bloating or expanding the material, cooling the material to rigidity and to a handling temperature by cooling slowly enough to prevent contraction cracking, and shaping the material into articles of manufacture.

17. The process of heating broken up argillaceous material under agitation in a kiln to a uniformly distributed temperature below that at which it becomes sticky, placing the so heated material on a thin layer of a parting material in a non-agitated state in a kiln or furnace in such a formed deposit as will contribute to its later assuming a somewhat predetermined shape, continuing the heating but at a higher temperature and with the material non-agitated, thereby bloating or expanding the material, and cooling the material to rigidity and to a handling temperature by cooling slowly enough to prevent contraction cracking.

18. The process of heating broken up argillaceous material under agitation in a kiln to a uniformly distributed temperature below that at which it becomes sticky, placing the so heated material on a thin layer of a parting material in a non-agitated state in a kiln or furnace in such a formed deposit as will contribute to its later assuming a somewhat predetermined shape, continuing the heating but at a higher temperature and with the material non-agitated, thereby bloating or expanding the material, cooling the material to rigidity and to a handling temperature by cooling slowly enough to prevent contraction cracking, and shaping the material into articles of manufacture.

19. The process of heating broken up argillaceous material under agitation to a uniformly distributed temperature below that at which it becomes sticky, placing the so heated material on a thin layer of a parting material under quiescent conditions in such a formed deposit as will contribute to its later assuming a somewhat predetermined shape, continuing heating the so deposited material to a higher temperature at which first the surface particles of the deposit fuse together forming a continuous sealing skin that imprisons the air between the inner particles, and then as it penetrates welds the buried particles together, expands the imprisoned air, and liberates and expands the heat generated gases so that the mass of material while in a fused condition expands or bloats, cooling the material to rigidity and to a handling temperature by cooling slowly enough to prevent contraction cracking.

20. The process of heating broken up argillaceous material under agitation to a uniformly distributed temperature below that at which it becomes sticky, placing the so heated material on a thin layer of parting material under quiescent conditions in such a formed deposit as will contribute to its later assuming a somewhat predetermined shape, continuing the heating of the so deposited material to a higher temperature at which first the surface particles of the deposit fuse together forming a sealing skin that imprisons the air between the inner particles, and then as it penetrates welds the buried particles together, expands the imprisoned air, and liberates and expands the heat generated gases, so that the mass of material expands or bloats, cooling the material to rigidity and to a handling temperature by cooling slowly enough to prevent contraction cracking, and shaping the material into articles of manufacture.

21. The process of producing cellular building material, which consists in introducing earthy material in granular form into a heat zone, leveling off the material to the desired depth, spreading a specially prepared layer of granular material over the surface to give the desired surface texture, and heating the material at a temperature adapted to first cause the formation by fusion of a surface skin, and thereafter cause bloating by the expansion of the material due to the evolution of gases within the interior.

22. The process of producing cellular building material, which consists in first preheating earthy material in granular form at a temperature below that which causes fusion of the material and in a non-oxydizing atmosphere, second in transferring the heated material to a heat zone elevated to a bloating temperature and in depositing the preheated material in the form of a layer of substantially uniform depth, and in bloating the material thus deposited in a non-oxydizing atmosphere, and third in transferring the material, after bloating, to an annealing zone and allowing the material to slowly cool in an oxydizing atmosphere.

23. The process of producing cellular building material, which consists in subjecting earthy material in granular form to preheating at a temperature below that of fusion and in a non-oxydizing atmosphere, second in treating the material while in the form of a layer of substantially uniform depth to a temperature sufficient to cause the formation by fusion of a surface skin, followed by bloating due to the evolution of gases in the interior of the mass and in a non-oxydizing atmosphere, and third in annealing the material in an oxydizing atmosphere.

24. The process of bloating broken up earthy material in granular form in the production of a column of cellular material which consists in introducing succeeding layers of earthy material while in the granular form within a confined heat zone maintained at a bloating temperature and in bringing such deposits into contacting relation with one another so that they become fused together in a continuous cellular mass.

25. The process of bloating broken up earthy material in granular form in the production of a column of cellular material which consists in introducing a layer of earthy material while in granular form into a confined heat zone maintained at a bloating temperature and in bloating such deposited layer within the heat zone and in then depositing a succeeding layer in granular form in contact with a portion of the surface of the already bloated layer to cause bloating of the last deposited layer, and fusion thereof to the previously bloated layer in the formation of a continuous cellular mass.

In witness that we claim the foregoing, we have hereunto subscribed our names this 23rd day of July, 1929.

KEMPER SLIDELL.
SHERMAN Q. LEE.